(12) United States Patent  (10) Patent No.: US 8,359,420 B2
Tsai et al.                  (45) Date of Patent:   Jan. 22, 2013

(54) EXTERNAL MEMORY BASED FIFO APPARATUS

(75) Inventors: Ching-Han Tsai, San Jose, CA (US); Cheng-Lun Chang, San Jose, CA (US); Jung-Tao Liu, San Jose, CA (US); Ya-Chau Yang, San Jose, CA (US)

(73) Assignee: Ablaze Wireless, Inc., San Jose, CA (US)

( * ) Notice: Subject to any disclaimer, the term of this patent is extended or adjusted under 35 U.S.C. 154(b) by 193 days.

(21) Appl. No.: 12/819,451

(22) Filed: Jun. 21, 2010

(65) Prior Publication Data

US 2010/0325334 A1   Dec. 23, 2010

Related U.S. Application Data

(60) Provisional application No. 61/218,953, filed on Jun. 21, 2009.

(51) Int. Cl.
 *G06F 13/28* (2006.01)
(52) U.S. Cl. .................................. 710/308; 710/306
(58) Field of Classification Search .............. 710/22–28, 710/30–309; 711/147–153, 104–105, 168–169
See application file for complete search history.

(56) References Cited

U.S. PATENT DOCUMENTS

| | | | | |
|---|---|---|---|---|
| 4,698,474 A * | 10/1987 | Gugel et al. | ................ | 219/60 A |
| 5,535,340 A * | 7/1996 | Bell et al. | ....................... | 710/112 |
| 5,884,100 A * | 3/1999 | Normoyle et al. | ............... | 710/52 |
| 5,905,876 A * | 5/1999 | Pawlowski et al. | ........... | 710/112 |
| 6,553,435 B1 * | 4/2003 | Normoyle et al. | ............... | 710/22 |
| 6,651,119 B2 * | 11/2003 | Ghodrat et al. | ................. | 710/40 |
| 7,673,091 B2 * | 3/2010 | Tiwari et al. | .................. | 710/308 |
| 8,006,001 B2 * | 8/2011 | Ellis et al. | ........................ | 710/24 |
| 2005/0223131 A1* | 10/2005 | Goekjian et al. | ................ | 710/22 |
| 2007/0016699 A1* | 1/2007 | Minami | .......................... | 710/20 |
| 2008/0228958 A1* | 9/2008 | Lindahl et al. | .................. | 710/22 |
| 2008/0235459 A1* | 9/2008 | Bell et al. | ....................... | 711/140 |
| 2008/0301376 A1* | 12/2008 | Allison et al. | ................ | 711/141 |
| 2008/0313363 A1* | 12/2008 | Granit et al. | .................... | 710/24 |
| 2009/0287857 A1* | 11/2009 | Vu | .................................. | 710/22 |

* cited by examiner

*Primary Examiner* — Raymond Phan

(74) *Attorney, Agent, or Firm* — Birch, Stewart, Kolasch & Birch, LLP

(57) ABSTRACT

An external memory based FIFO (xFIFO) apparatus coupled to an external memory and a register bus is disclosed. The xFIFO apparatus includes an xFIFO engine, a wDMA engine, an rDMA engine, a first virtual FIFO, and a second virtual FIFO. The xFIFO engine receives a FIFO command from the register bus and generates a writing DMA command and a reading DMA command. The wDMA engine receives the writing DMA command from the xFIFO engine and forwards an incoming data to the external memory. The rDMA engine receives the reading DMA command from the xFIFO engine and pre-fetches a FIFO data from the external memory. The wDMA engine and the rDMA engine synchronize with each other via the first virtual FIFO and the second virtual FIFO.

10 Claims, 2 Drawing Sheets

EXTERNAL MEMORY BASED FIFO APPARATUS

CROSS REFERENCE TO RELATED APPLICATIONS

This nonprovisional application claims the benefit of U.S. Provisional Application No. 61/218,953 filed on Jun. 21, 2009. The entire contents of the above application is hereby incorporated by reference into the present application.

BACKGROUND OF THE INVENTION

1. Field of the Invention

The present invention relates to inter-processor communication, and more particularly, to inter-processor communication assisted by an external memory based first-in-first-out (xFIFO) apparatus.

2. Description of the Prior Art

In general, conventional basestation transceivers are connected to the basestation controllers through dedicated communication links such as T1 or E1 lines. These basestation controllers are connected to each other and also connected to other network equipments such as Serving GPRS Support Node (SGSN) or Gateway GPRS Support Node (GGSN) in General Packet Radio Service (GPRS) network. Recently, a femtocell (Home Node B) is a miniature device in the size of a CPE which functions as a combination of RNC and Home Node B and is connected through internet to the Core Network.

A femtocell baseband system-on-chip (SOC) consists of multiple Nios II embedded processor cores, as well as various hardware accelerators and peripheral interface logic. These processor cores are responsible for running many different software components, from device drivers, firmware, communication protocol stack, all the way up to the user level applications. Periodically, the different software threads need to communicate with each other, either to exchange control or data information or to synchronize with each other, to ensure that the events on different processor cores happen in the proper order and with the correct outcome. With up to concurrent 16 users incurring both voice and data traffic, the femtocell SOC demands that the inter-processor communications (IPC) between these software components be fast and efficient.

In general, typical IPC schemes used in a multi-core embedded system include message passing, shared memory, one-to-one synchronization metaphor (e.g., semaphores and signals), and N-to-one synchronization metaphor (e.g., spin-lock or test-and-set). Our hardware support for IPC is focused on the message passing method. In the message-passing IPC paradigm, a software thread does not share any common memory space with the other software thread it wishes to communicate. Instead, they communicate with each other via a simplex (one-directional) FIFO queue, for which one thread has a fixed role as the producer, and the other as the consumer. If a duplex message passing interface is required, two such FIFO queues may be employed.

Since we always have no idea beforehand about how much data should be exchanged between two different software threads or how frequently, therefore, the message FIFO between two processor cores needs to be low latency, so that the processors will not be slowed down due to frequent communication, and needs to be large-sized to avoid unnecessary coupling between the two processor cores due to FIFO fullness/emptiness. In order to achieve low access latency, an on-chip memory is typically used to provide the buffer space, whereas to provide large amount of buffer space, an off-chip memory (e.g., DRAM) is often employed for data storage.

Although the off-chip memory is much cheaper than the on-chip memory, the access latency for the off-chip memory is often much higher than that for the on-chip memory. Therefore, the need for lower access latency and the need for larger buffer space are contradictory; it is hard for the designer to select one from the off-chip memory and the on-chip memory.

Therefore, the invention provides an inter-processor communication assisting apparatus to solve the aforementioned problems.

SUMMARY OF THE INVENTION

In this invention, the hardware acceleration for efficient message passing inter-processor communication in a femtocell SOC is provided by an external memory based FIFO (xFIFO) built upon a multi-threaded direct memory access (DMA) engine.

An embodiment of the invention is an external memory based first-in-first-out (xFIFO) apparatus. The xFIFO apparatus is coupled to an external memory and a register bus respectively. The register bus is coupled to at least two processors. The xFIFO apparatus includes an xFIFO engine, a writing direct memory access (wDMA) engine, a reading DMA (rDMA) engine, a first virtual FIFO, and a second virtual FIFO. The first virtual FIFO and the second virtual FIFO are both coupled between the wDMA engine and the rDMA engine.

In this embodiment, the xFIFO engine is coupled to the register bus and used for receiving a FIFO command from the register bus and generating a writing DMA (wDMA) command and a reading DMA (rDMA) command. The wDMA engine is coupled to the xFIFO engine and the external memory and used for receiving the writing DMA command from the xFIFO engine and forwarding an incoming data to the external memory. The rDMA engine is coupled to the xFIFO engine and the external memory and used for receiving the reading DMA command from the xFIFO engine and pre-fetching a FIFO data from the external memory. The wDMA engine and the rDMA engine synchronize with each other via the first virtual FIFO and the second virtual FIFO.

Compared to prior arts, the inter-processor communication assisting apparatus of the invention uses the external memory based FIFO (xFIFO) to provide the hardware acceleration for efficient message passing inter-processor communication in the femtocell SOC built upon a multi-threaded direct memory access (DMA) engine. The xFIFO contains minimum on-chip buffer for write buffering and read caching to provide lower access latency. Therefore, the inter-processor communication assisting apparatus of the invention can provide lower access latency and the cheaper off-chip memory can be used in the femtocell SOC at the same time.

Furthermore, the xFIFO contains custom logic that ensures data coherency between the producer and consumer, and supports configurable buffer address and size, and robust error recovery.

The objective of the present invention will no doubt become obvious to those of ordinary skill in the art after reading the following detailed description of the preferred embodiment, which is illustrated in the various figures and drawings.

BRIEF DESCRIPTION OF THE APPENDED DRAWINGS

DETAILED DESCRIPTION OF THE INVENTION

Figure 1:
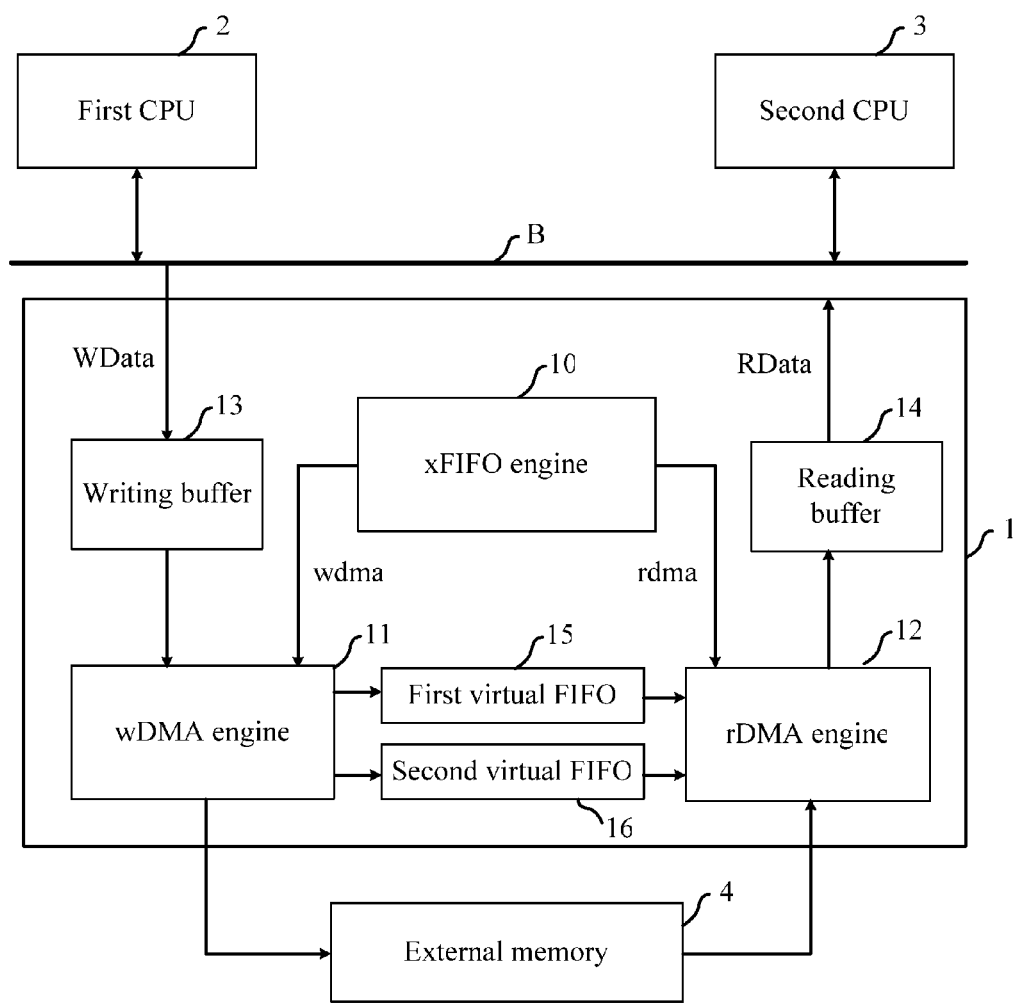
FIG. 1 illustrates a functional block diagram of the single-threaded external memory based FIFO (xFIFO) apparatus.

The invention provides an inter-processor communication assisted by hardware. A first embodiment of the invention is a single-threaded external memory based FIFO (xFIFO) apparatus. By combining a pair of rDMA engine and wDMA engine with virtual FIFOs, register-based data ports, and a simple DMA command generator, a simple external-memory based FIFO (xFIFO) apparatus can be implemented as follows. Please refer to FIG. 1. FIG. 1 illustrates a functional block diagram of the single-threaded external memory based FIFO (xFIFO) apparatus.

As shown in FIG. 1, the single-threaded external memory based FIFO apparatus 1 is coupled to an external memory 4 and a register bus B respectively, and the register bus B is coupled to a first CPU 2 and a second CPU 3. The single-threaded external memory based FIFO apparatus 1 includes an xFIFO engine 10, a wDMA engine 11, an rDMA engine 12, a writing buffer 13, a reading buffer 14, a first virtual FIFO 15, and a second virtual FIFO 16.

In this embodiment, the xFIFO engine 10 is coupled to the wDMA engine 11 and the rDMA engine 12; the register bus B is coupled to the writing buffer 13; the writing buffer 13 is coupled to the wDMA engine 11; the wDMA engine 11 is coupled to the external memory 4, the first virtual FIFO 15, and the second virtual FIFO 16 respectively; the external memory 4, the xFIFO engine 10, the first virtual FIFO 15, and the second virtual FIFO 16 are all coupled to the rDMA engine 12 respectively; the rDMA engine 12 is coupled to the reading buffer 14; the reading buffer 14 is coupled to the register bus B.

At first, the setup of xFIFO will be introduced. Software should be used to initialize the xFIFO module by programming a special config register with the following information: (1) FIFO base address; (2) FIFO size; (3) FIFO data unit size.

Typically, the FIFO base address falls within the off-chip memory address space. By using the external memory, the xFIFO can support very deep data FIFOs with minimum extra hardware cost. And, the parameter FIFO size indicates the total amount of buffer space available. The address generator inside xFIFO will use the FIFO size to ensure the data addresses always fall within the legal range.

Logically speaking, the xFIFO consists of multiple data items of the same size. Synchronization between the FIFO producer and the FIFO consumer is based on the data unit. The producer status is updated only when a complete data unit is written to xFIFO. The consumer will treat the xFIFO as empty when it contains only a partial data unit. Similarly, the consumer status is updated only when a complete data unit is read from xFIFO. The only exception is when the end of a data packet is reached, which automatically triggers the synchronization between the producer and the consumer even if the accumulated data not amount to one full data unit.

The xFIFO setup only initializes the xFIFO hardware to be ready for the data transfer. The exact details regarding the amount of data to be transferred and synchronization method is provided via the packet register containing the information of packet size; the information of whether the producer should trigger an interrupt after the complete packet is written into xFIFO, and the ID of the interrupt to be raised; the information of whether the consumer should trigger an interrupt after the complete packet is written into xFIFO, and the ID of the interrupt to be raised.

Based on the information in the packet register, the xFIFO engine 10 will generate commands for both wDMA engine 11 and rDMA engine 12. The wDMA commands will set up wDMA engine 11 to forward incoming data to the external memory 4. Similarly, the rDMA commands generated by the xFIFO engine 10 will set up rDMA engine 12 to pre-fetch FIFO data from the external memory 4. Depending on the packet size, more than one wDMA/rDMA commands may be generated for the data packet. There shall be some amount of write buffering and read prefetching between the xFIFO engine 10 and the wDMA engine 11/the rDMA engine 12. The amount of writing buffering and read prefetching shall be design parameters.

It should be noticed that the wDMA engine 11 and the rDMA engine 12 synchronize with each other via two virtual FIFOs (i.e., the first virtual FIFO 15 and the second virtual FIFO 16) or two shared semaphores. The depths of the first virtual FIFO 15 and the second virtual FIFO 16 shall be the same as the total FIFO size divided by the FIFO data unit size. This is equal to the xFIFO capacity based on the data unit, and is independent of the data packet size. The operation of the first virtual FIFO 15 and the second virtual FIFO 16 will be discussed as follows.

In this embodiment, the xFIFO engine 10 issues DMA commands to the wDMA engine 11 and the rDMA engine 12 with the granularity of data units. For example, if each data unit contains 4 dWords, then the xFIFO engine 10 will continue to generate one wdma/rdma command for every 4 dWords, except for the last partial data unit at the end of a data packet.

Prior to each wdma command, the wDMA engine 11 shall attempt to "write" one unit to the first virtual FIFO 15. If there is no available space in the first virtual FIFO 15, the virtual FIFO writing operation will be stalled. Once the writing of the first virtual FIFO 15 is finished, the wDMA engine 11 will proceed to process the actual data transferring of the current data unit. Since the virtual FIFO is used, the writing operation only updates the virtual FIFO status; no actual data is written to the first virtual FIFO 15.

After a wDMA command is finished, the wDMA engine 11 will write one unit to the second virtual FIFO 16 to update the status of the second virtual FIFO 16 as well. Similarly, prior to each rDMA command, the rDMA engine 12 will attempt to "read" one data unit from the second virtual FIFO 16 (not the first virtual FIFO 15). The virtual FIFO reading operation will be stalled when there is no available data in the second virtual FIFO 16. Once the reading of the second virtual FIFO 16 is finished, the rDMA engine 12 will proceed to process the actual data transfer of the current data unit. Since the virtual FIFO is used, the reading operation only updates the virtual FIFO status; no actual data is red from the second virtual FIFO 16. After the rDMA command is finished, the rDMA engine 12 will read one unit from the first virtual FIFO 15 to update the status of the first virtual FIFO 15 as well.

That is to say, for either the wDMA engine 11 or the rDMA engine 12, one of the first virtual FIFO 15 and the second virtual FIFO 16 is used for "reservation" prior to a data unit transfer, while the other is used for "commitment" after a data unit transfer. From the perspective of the rDMA engine 12, a reading operation can begin only when a prior writing operation has been committed to the second virtual FIFO 16 after the writing operation is finished. As a result, the rDMA engine 12 should check the second virtual FIFO 16 (not the first virtual FIFO 15) prior to reading a data unit from the xFIFO engine 10.

The story from the perspective of the wDMA engine 11 is the exact mirror of that of the rDMA engine 12. The xFIFO engine 10 will issue the correct DMA commands to instruct both the wDMA engine 11 and the rDMA engine 12 to perform the necessary virtual FIFO operations via the semaphore related bit fields in the DMA command. In other words, the interactions between the virtual FIFOs and the DMA engines are completely hidden from software or the external FIFO master.

A typical usage of the xFIFO engine 10 is to act as a message queue between two embedded CPUs (the first CPU 2 and the second CPU 3). However, xFIFO can also be used to provide a very deep FIFO queue between two hardware modules. The actual information to be passed through the xFIFO engine 10 is of no concern to the xFIFO hardware. Rather, the software running on the first CPU 2 and the second CPU 3 shall communicate with each other on the size and the meaning of the data packets via other means. For example, by predefined protocol, or via a packet header pre-pended to each packet.

The actual data to be passed between the first CPU 2 and the second CPU 3 may be generated by the software itself on-the-fly; or it may already be stored in a separate piece of memory (e.g., on-chip SRAM or off-chip DRAM); or it may be a mixture of both. In order to maintain the first-in-first-out nature of the inter-processor data, the xFIFO engine 10 needs to be able to take data coming in from CPU on-the-fly as well as data in the memory already, and assemble them a seamless fashion as follows.

Firstly, a special register port cmd is defined. The data to be written into the register port cmd should be of a type dmaCmd. At any time, there should be only one CPU controlling the xFIFO engine 10 (the producer). If the first CPU 2 controls the xFIFO engine 10, the first CPU 2 triggers the xFIFO operation by either writing to the packet register port, or by writing to the register port cmd. Parameters coming via either the cmd or packet register ports will be collected into a single command queue. The xFIFO engine 10 shall handle the commands inside the command queue in order. If the command is through the packet register port, then the xFIFO engine 10 generates the corresponding wDMA or rDMA commands, as discussed above; if the command is through the cmd register port, then the xFIFO engine 10 will simply forward the incoming DMA command to the rDMA engine 12, and the rDMA engine 12 will automatically fetch the data from the buffer as specified.

It should be noticed that the FIFO data control value needs to be updated to reflect the dmaCmd data size. As the xFIFO engine 10 forwards the dmaCmd to the rDMA engine 12, it should increment the data control value by the data size indicated in the DMA command. The data control value will be decremented as normal when the consumer CPU (the second CPU 3) reads the data from the rdata port. The virtual FIFO operations shall be skipped for any dmaCmd received by xFIFO. Any semaphore operations specified in the received dmaCmd shall also be cleared by the xFIFO engine 10 before it forwards the dmaCmd to the rDMA engine 12.

Next, xFIFO access and error handling will be discussed. In this embodiment, the FIFO producer and consumer can be software or hardware based. If software intends to write to or read from xFIFO, the special registers wdata and rdata shall be used. Access to these two registers is non-blocking. If the FIFO is already full while software writes to the wdata register, then the writing data will be discarded, and the overflow bit in the special error register will be set. Similarly, if the FIFO is already empty while software reads from the rdata register, then zero will be returned to the CPU, and the underflow bit in the error register will be set. To prevent overflow and underflow from happening, software shall periodically check the data control value in the special status register prior to accessing wdata/rdata registers.

The reason why accessing wdata/rdata is non-blocking with error reporting is because in the case when a shared register bus is used, a blocking operation will result in deadlocking the system, since the bus is occupied, preventing the other party from accessing the register to clear the error condition. On the other hand, for hardware accessing the reading/writing data ports, the operations will be blocking, just like a regular register-based FIFO access.

It should be noticed that the non-blocking operation is meaningful only with respect to the actual FIFO status, and not related to the local write collection or read prefetch buffers within xFIFO. If the xFIFO status is non-full, but the local write collection buffer is full due to DRAM traffic backpressure, the operation will be stalled temporarily until local write buffer is freed up. Similarly, if the xFIFO status is non-empty, but the local read prefetch buffer is empty due to DRAM access latency, then the read operation will be stalled temporarily until the local read buffer is filled with data from the external memory. In order for this scheme to work without resulting in system deadlock, however, the register bus and the data bus need to be separate, for example, by using a cross-bar interconnect fabric in the system.

If the FIFO producer attempts to write when the xFIFO engine 10 is disabled, the writing operation will be complete with no data written into the FIFO. In addition, the overflow error flag will be set. Similarly, if a FIFO consumer attempts to read when the xFIFO is disabled, the reading operation will be completed with zero as the return data, and the underflow flag will be set.

Prior to any xFIFO operations, the xFIFO configuration shall be set up by software at first. The xFIFO engine 10 can be enable/disabled and cleared via a special control register. The xFIFO engine 10 provides the following FIFO status via the status register: full, empty, and data count. The xFIFO engine 10 also maintains the busy/idle status in the status register. The meaning of the busy/idle shall be discussed in conjunction with the enable/disable and clear operations. After the xFIFO engine 10 is enabled, and before a packet is received, the xFIFO engine 10 will stay in the idle state. As soon as a packet command is received, the xFIFO engine 10 enters into a busy mode, continuing to process the packet until the transfer is finished, and then it returns back to the idle state.

When the xFIFO engine 10 is disabled, the state machine enters into a special cleanup mode, which will finish any pending bus transactions, if there is any. After all the pending transactions are finished, the xFIFO engine 10 changes the status back to idle to indicate that the xFIFO state machine is halted, regardless of whether there is any pending packet commands. At that time, software can either re-enable xFIFO, which will cause the state machine to enter the free-running mode; or software can write to the clear bit, which will clear both of two virtual FIFOs as well as the writing buffer and prefetch cache. It should be noticed that the FIFO command can only be updated when the xFIFO engine 10 is in disabled and idle state.

Figure 2:
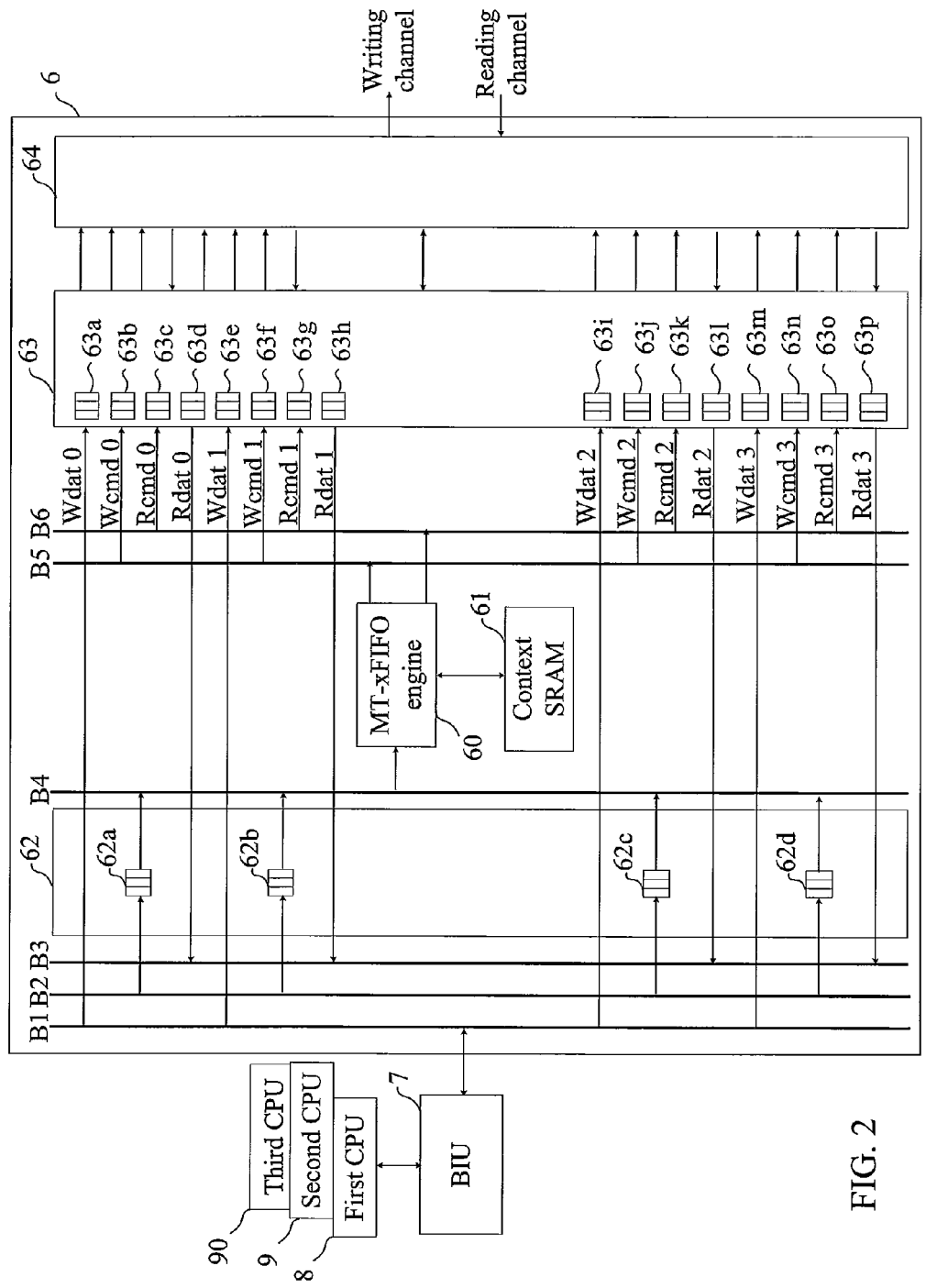
FIG. 2 illustrates a functional block diagram of the multi-threaded external memory based FIFO (MT-xFIFO) apparatus.

A second embodiment of the invention is a multi-threaded external memory based FIFO (MT-xFIFO) apparatus. Three different hardware modules: multi-threaded xFIFO engine (MT-xFIFO engine), DMA cmd/data queue, and multi-threaded DMA engine (dmaX) provide the multi-threaded xFIFO (MT-xFIFO) functionality. It is implemented as a design template, and should be configured based on the actual number of threads required. In MT-xFIFO, each thread is backward-compatible with the single thread xFIFO and works independent from other thread. Please refer to FIG. 2. FIG. 2 illustrates a functional block diagram of the multi-threaded external memory based FIFO (MT-xFIFO) apparatus.

As shown in FIG. 2, the multi-threaded external memory based FIFO apparatus 6 is coupled to a first CPU 8, a second CPU 9, and a third CPU 90 through a BIU (Bus Interface Unit) 7. In fact, the number of the CPUs is not limited by this case. The multi-threaded external memory based FIFO 6 includes a MT-xFIFO engine 60, a context SRAM 61, a packet cmd queue (Multi-Q) 62, a DMA cmd/data queue (Multi-Q) 63, a dmaX 64, a wdat bus B1, a cmd bus B2, a rdat bus B3, a packet cmd bus B4, a dma wcmd bus B5, a dma rcmd bus B6. Wherein, the packet cmd queue 62 includes queues 62a, 62b, 62c, and 62d; the DMA cmd/data queue 63 includes queues 63a~63p. The MT-xFIFO engine 60 is coupled to the packet cmd bus B4, the dma wcmd bus B5, the dma rcmd bus B6, and the context SRAM 61.

In this embodiment, the wdat bus B1 sends writing data signals Wdat 0, Wdat 1, Wdat 2, and Wdat 3 to the queues 63a, 63e, 63i, and 63m of the DMA cmd/data queue 63; the cmd bus B2 sends BIU commands to the queues 62a, 62b, 62c, and 62d respectively; the rdat bus B3 receives reading data signals Rdat 0, Rdat 1, Rdat 2, Rdat 3 from the queues 63d, 63h, 63l, and 63p of the DMA cmd/data queue 63; the packet cmd bus B4 receives queue commands from the queues 62a, 62b, 62c, and 62d respectively and then sends a packet command to the MT-xFIFO engine 60; the dma wcmd bus B5 receives a FIFO writing signal from the MT-xFIFO engine 60 and then sends writing commands Wcmd 0, Wcmd 1, Wcmd 2, and Wcmd 3 to the queues 63b, 63f, 63j, and 63n of the DMA cmd/data queue 63; the dma rcmd bus B6 receives a FIFO reading signal from the MT-xFIFO engine 60 and sends reading commands Rcmd 0, Rcmd 1, Rcmd 2, and Rcmd 3 to the queues 63c, 63g, 63k, and 63o of the DMA cmd/data queue 63; the dmaX 64 sends reading data signals to the queues 63d, 63h, 63l, and 63p respectively. The dmaX 64 can communicate with a writing channel and a reading channel.

The input of the MT-xFIFO apparatus 6 is a hardware interface of the BIU 7 and the output of the MT-xFIFO apparatus 6 is the data bus in the SOC. When one of the threads is enabled, the MT-xFIFO engine 60 will check the status of all threads one by one. With checking the status of packet command and DMA command queue, the MT-xFIFO engine 60 can generate a series writing/reading DMA commands per one packet command from host. After the MT-xFIFO engine 60 issues r/wDMA commands to dmaX 64, the write DMA engine starts to move the data from the data queues into the context SRAM 61 and the read DMA engine moves the data from the context SRAM 61 into data queue.

At the same time, the host can read/write new data from/into the data queue without interfacing operations of the MT-xFIFO engine 60. In other words, the host can send/receive the information data to/from the data queue and the MT-xFIFO engine 60 can serve each thread to generate r/w DMA command at the same time. It should be noticed that operations of the host and the MT-xFIFO engine 60 are independent with each other. Thus, the communication between the hosts can be done only by issuing packet command directly without generating series read/write DMA commands to the dmaX 64, and the MT-xFIFO engine 60 can just only issue r/w DMA command according to packet command from the hosts.

When the MT-xFIFO apparatus 6 is enabled, the MT-xFIFO engine 60 performs some operations thread by thread including the steps of (1) checking if current thread was in enable status or clear status; (2) generating a series of read/write DMA command if there are new packet commands in packet command queue 62 and empty slots in the read/write DMAs command queue 63; (3) generating series read/write DMA command if there is any un-finished packet commands in the MT-xFIFO engine 60 and empty slots in the read/write DMAs command queue 63; (4) restoring/storing the current thread status to/from the context SRAM 61 when the MT-xFIFO engine 60 is doing the thread switching.

If one of the following conditions is met, the MT-xFIFO engine 60 will do the thread switching: (1) current thread is not enabled; (2) current packet command is done or there is no new packet command in the command queue for this thread; (3) no slots spaces in both read and write DMA command queue. And, the context SRAM 61 is used as storage media to store necessary information for the thread operation.

In order to maximize design flexibility and minimize hardware resource requirement, the depth of each queue in the Multi-Q and maximum support thread number in the MT-xFIFO engine 60 can be adjusted easily through reconfiguration of the Multi-Queue 62 and 63, the dmaX 64, and the MT-xFIFO engine 60. Thus, redesigning the whole module is not necessary.

Compared to prior arts, the inter-processor communication assisting apparatus of the invention uses the external memory based FIFO (xFIFO) to provide the hardware acceleration for efficient message passing inter-processor communication in the femtocell SOC built upon a multi-threaded direct memory access (DMA) engine. The xFIFO contains minimum on-chip buffer for write buffering and read caching to provide lower access latency. Therefore, the inter-processor communication assisting apparatus of the invention can provide lower access latency and the cheaper off-chip memory can be used in the femtocell SOC at the same time.

Furthermore, the xFIFO contains custom logic that ensures data coherency between the producer and consumer, and supports configurable buffer address and size, and robust error recovery.

Although the present invention has been illustrated and described with reference to the preferred embodiment thereof, it should be understood that it is in no way limited to the details of such embodiment but is capable of numerous modifications within the scope of the appended claims.

What is claimed is:

1. An external memory based first-in-first-out (xFIFO) apparatus, coupled to an external memory and a register bus respectively, the xFIFO apparatus comprising:
   an xFIFO engine, coupled to the register bus, for receiving a FIFO command from the register bus and generating a writing direct memory access (DMA) command and a reading DMA command;
   a writing DMA (wDMA) engine, coupled to the xFIFO engine and the external memory, for receiving the writing DMA command from the xFIFO engine and forwarding an incoming data to the external memory;
   a reading DMA (rDMA) engine, coupled to the xFIFO engine and the external memory, for receiving the reading DMA command from the xFIFO engine and prefetching a FIFO data from the external memory;
   a first virtual FIFO; and
   a second virtual FIFO;
   wherein the first virtual FIFO and the second virtual FIFO are coupled between the wDMA engine and the rDMA engine in parallel, the wDMA engine and the rDMA engine synchronize with each other via the first virtual FIFO and the second virtual FIFO.

2. The xFIFO apparatus of claim 1, wherein prior to issuing the writing DMA command, the wDMA engine performs a virtual FIFO writing operation to the first virtual FIFO.

3. The xFIFO apparatus of claim 2, wherein once the virtual FIFO writing operation performed to the first virtual FIFO is finished, the wDMA engine forwards the incoming data to the external memory.

4. The xFIFO apparatus of claim 1, wherein after the writing DMA command is finished, the wDMA engine performs a writing operation to the second virtual FIFO to update a status of the second virtual FIFO.

5. The xFIFO apparatus of claim 1, wherein prior to issuing the reading DMA command, the rDMA engine performs a virtual FIFO reading operation from the second virtual FIFO.

6. The xFIFO apparatus of claim 1, wherein after the reading DMA command is finished, the rDMA engine performs a reading operation from the first virtual FIFO to update a status of the first virtual FIFO.

7. The xFIFO apparatus of claim 1, wherein the xFIFO apparatus is a multi-threaded xFIFO (MT-xFIFO) apparatus, an input of the xFIFO apparatus is a hardware interface of a bus interface unit (BIU) and an output of the xFIFO apparatus is an SOC bus interface.

8. The xFIFO apparatus of claim 1, further comprising a context memory coupled to the xFIFO engine, wherein after the xFIFO engine issues the reading DMA command or the writing DMA command to the rDMA engine or the wDMA engine, the xFIFO engine will copy the context information of the current thread into the context memory, and fetch the context information of the next thread from the context memory.

9. The xFIFO apparatus of claim 1, wherein the register bus is coupled to at least two processors and the xFIFO apparatus enhances the communication between the at least two processors through the register bus.

10. The xFIFO apparatus of claim 5, wherein once the virtual FIFO reading operation from the second virtual FIFO is finished, the rDMA engine pre-fetches the FIFO data from the external memory.

* * * * *